US009919591B2

(12) United States Patent
Mizoguchi et al.

(10) Patent No.: US 9,919,591 B2
(45) Date of Patent: Mar. 20, 2018

(54) VEHICLE BATTERY COOLING STRUCTURE

(75) Inventors: Satoru Mizoguchi, Isehara (JP); Hirofumi Uchiyama, Tokyo (JP); Shinya Ogata, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 703 days.

(21) Appl. No.: 13/319,884

(22) PCT Filed: May 14, 2010

(86) PCT No.: PCT/IB2010/001133
§ 371 (c)(1),
(2), (4) Date: Nov. 10, 2011

(87) PCT Pub. No.: WO2010/136863
PCT Pub. Date: Dec. 2, 2010

(65) Prior Publication Data
US 2012/0055725 A1    Mar. 8, 2012

(30) Foreign Application Priority Data

May 26, 2009    (JP) ................................ 2009-126791
Jan. 13, 2010    (JP) ................................ 2010-005104

(51) Int. Cl.
*B60K 1/04*        (2006.01)
*B60L 11/18*      (2006.01)
(Continued)

(52) U.S. Cl.
CPC ............ *B60K 1/04* (2013.01); *B60L 11/1874* (2013.01); *B60L 11/1877* (2013.01);
(Continued)

(58) Field of Classification Search
CPC ........... B60R 16/04; B60K 2001/0438; H01M 2/1077; H01M 2/1083; H01M 10/5057; B60L 11/1874
(Continued)

(56) References Cited

U.S. PATENT DOCUMENTS 5,510,207 A * 4/1996 Grivel et al. ................. 429/120
6,094,927 A * 8/2000 Anazawa et al. ............... 62/239
(Continued)

FOREIGN PATENT DOCUMENTS

CN        1638185 A      7/2005
CN     101090838 A     12/2007
(Continued)

OTHER PUBLICATIONS

A Written Opinion of the International Search Authority for International Application No. PCT/IB2010/001133, dated Aug. 30, 2010, dated Sep. 7, 2010.
(Continued)

*Primary Examiner* — James A Shriver, II
*Assistant Examiner* — Brian L Cassidy
(74) *Attorney, Agent, or Firm* — Global IP Counselors, LLP

(57) ABSTRACT

A vehicle battery cooling structure is provided with a vehicle body, a battery unit and a cooling jacket. The vehicle body includes a floor panel and a vehicle body frame member. The battery unit is attached to the vehicle body frame member. The battery unit is arranged below the floor panel. The battery unit includes a battery case and a battery. The cooling jacket is attached to an upper surface of the battery case that houses the battery.

17 Claims, 9 Drawing Sheets

(51) Int. Cl.

| | | |
|---|---|---|
| *H01M 2/10* | (2006.01) | |
| *H01M 10/625* | (2014.01) | |
| *H01M 10/6563* | (2014.01) | |
| *H01M 10/6554* | (2014.01) | |
| *H01M 10/6566* | (2014.01) | |
| *H01M 10/613* | (2014.01) | |
| *B60K 1/00* | (2006.01) | |
| *H01M 10/647* | (2014.01) | |
| *H01M 10/6556* | (2014.01) | |
| *H01M 10/6567* | (2014.01) | |

(52) U.S. Cl.
CPC ....... *H01M 2/1077* (2013.01); *H01M 10/613* (2015.04); *H01M 10/625* (2015.04); *H01M 10/6554* (2015.04); *H01M 10/6563* (2015.04); *H01M 10/6566* (2015.04); *B60K 2001/005* (2013.01); *B60K 2001/0438* (2013.01); *H01M 10/647* (2015.04); *H01M 10/6556* (2015.04); *H01M 10/6567* (2015.04); *Y02T 10/7005* (2013.01); *Y02T 10/705* (2013.01)

(58) Field of Classification Search
USPC ........................................................ 180/68.5
See application file for complete search history.

(56) References Cited

U.S. PATENT DOCUMENTS

| | | | |
|---|---|---|---|
| 6,109,380 A * | 8/2000 | Veenstra ................. | 180/68.5 |
| 6,394,210 B2 * | 5/2002 | Matsuda et al. ........... | 180/68.1 |
| 6,840,050 B2 * | 1/2005 | Pode ..................... | 62/3.61 |
| 7,399,551 B2 | 7/2008 | Yagi et al. | |
| 7,560,190 B2 * | 7/2009 | Ahn et al. ................ | 429/120 |
| 7,810,596 B2 | 10/2010 | Tsuchiya | |
| 8,012,620 B2 | 9/2011 | Takasaki et al. | |
| 2002/0043413 A1 * | 4/2002 | Kimishima et al. ......... | 180/68.1 |
| 2004/0180257 A1 * | 9/2004 | Kimoto .................... | 429/120 |
| 2006/0169507 A1 * | 8/2006 | Inoue et al. ................ | 180/68.4 |
| 2008/0173488 A1 * | 7/2008 | Takasaki .................. | 180/68.5 |
| 2008/0173489 A1 * | 7/2008 | Takasaki .................. | 180/68.5 |
| 2008/0190679 A1 * | 8/2008 | Sato et al. ................. | 180/68.5 |
| 2008/0276632 A1 * | 11/2008 | Kumar ..................... | 62/118 |
| 2009/0145676 A1 * | 6/2009 | Takasaki et al. ........... | 180/65.1 |
| 2009/0152034 A1 * | 6/2009 | Takasaki et al. ........... | 180/68.5 |
| 2009/0186266 A1 * | 7/2009 | Nishino et al. ............. | 429/120 |
| 2009/0197154 A1 * | 8/2009 | Takasaki et al. ........... | 429/83 |
| 2009/0242299 A1 * | 10/2009 | Takasaki et al. ........... | 180/68.5 |
| 2011/0297467 A1 * | 12/2011 | Iwasa et al. ............... | 180/65.31 |
| 2011/0297469 A1 * | 12/2011 | Usami et al. ............... | 180/68.5 |
| 2012/0018238 A1 * | 1/2012 | Mizoguchi et al. ......... | 180/68.5 |
| 2013/0177791 A1 * | 7/2013 | Takahashi et al. ......... | 429/72 |

FOREIGN PATENT DOCUMENTS

| | | |
|---|---|---|
| CN | 101209661 A | 7/2008 |
| JP | 07-156826 | 6/1995 |
| JP | 10-138956 | 5/1998 |
| JP | 10-138956 A | 5/1998 |
| JP | 2000348781 A | 12/2000 |
| JP | 2003-291656 | 10/2003 |
| JP | 2003-291656 A | 10/2003 |
| JP | 2003-297439 A | 10/2003 |
| JP | 2008-162497 | 7/2008 |
| JP | 2009-087773 | 4/2009 |
| JP | 2009-087773 A | 4/2009 |
| JP | 2009087757 A | 4/2009 |
| RU | 2144869 C1 | 1/2000 |

OTHER PUBLICATIONS

An International Preliminary Report on Patentability for International Application No. PCT/IB2010/001133 dated Sep. 1, 2011.
An English translation of the Russian Decision on Grant of corresponding Russian Application No. 2011152934, dated Jan. 28, 2013.
The Mexican Office Action for the corresponding Mexican patent application No. MX/a/2011/012424 dated Jul. 5, 2013.
An English translation of the Japanese Notification of Reason for Rejection of corresponding Japanese Application No. 2010-005104, dated Aug. 20, 2013.
An English translation of the Japanese Office Action for the corresponding Japanese patent application No. 2010-005104 dated Nov. 26, 2013.
An English translation of the Chinese Office Action for the corresponding Chinese patent application No. 201080023156.1 dated Jan. 10, 2014.
Mexican Office Action for the corresponding Mexican patent application No. MX/a/2012/012424, dated Jan. 24, 2014.
An English translation of the Chinese Office Action for the corresponding Chinese patent application No. 201080023156.1 dated Sep. 11, 2014.
Mexican Office Action for the corresponding Mexican patent application No. MX/a/2012/012424, dated Apr. 30, 2014.

* cited by examiner

VEHICLE BATTERY COOLING STRUCTURE

CROSS-REFERENCE TO RELATED APPLICATIONS

This application is a U.S. National stage of International Application No. PCT/IB2010/001133, filed May 14, 2010, which claims priority to Japanese Patent Application Nos. 2009-126791, filed on May 26, 2009 and 2010-005104, filed on Jan. 13, 2010. The entire disclosures of Japanese Patent Application Nos. 2009-126791 and 2010-005104 are hereby incorporated herein by reference.

BACKGROUND

Field of the Invention

The present invention generally relates to a vehicle battery unit cooling structure for cooling a battery unit. More specifically, the present invention relates to a vehicle battery unit cooling structure that cools an upper surface of a battery unit.

Background Information

Electric vehicles often include a battery unit. The battery unit can be formed of a plurality of batteries. The battery unit is sometimes arranged under a floor of the vehicle. One example of such an electric vehicle is disclosed in Japanese Laid-Open Patent Publication No. 10-138956.

SUMMARY

It has been discovered that it desirable to cool a vehicle battery appropriately when the vehicle battery is being used, because the vehicle battery emits heat. In the vehicle disclosed in Japanese Laid-Open Patent Publication No. 10-138956, a bottom surface of the battery unit is exposed to moving air when the vehicle is driven. In this way, a bottom portion of the battery unit can be cooled comparatively easily. Conversely, since a floor panel exists above the battery unit, it is difficult to secure a large gap between the battery unit and the floor panel in situations where the floor panel cannot easily be set at a high position. Consequently, there is the possibility that it will be difficult to cool an upper portion of the battery unit with air flowing through the gap when the vehicle is driven.

An object of the present invention is to provide a vehicle battery cooling structure that that enables an upper portion of a battery unit to be cooled effectively.

In view of the state of the known technology, one aspect of the present invention is to provide a vehicle battery cooling structure that mainly comprises a vehicle body, a battery unit and a cooling jacket. The vehicle body includes a floor panel and a vehicle body frame member. The battery unit is attached to the vehicle body frame member. The battery unit is arranged below the floor panel. The battery unit includes a battery case and a battery. The cooling jacket is attached to an upper surface of the battery case that houses the battery.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
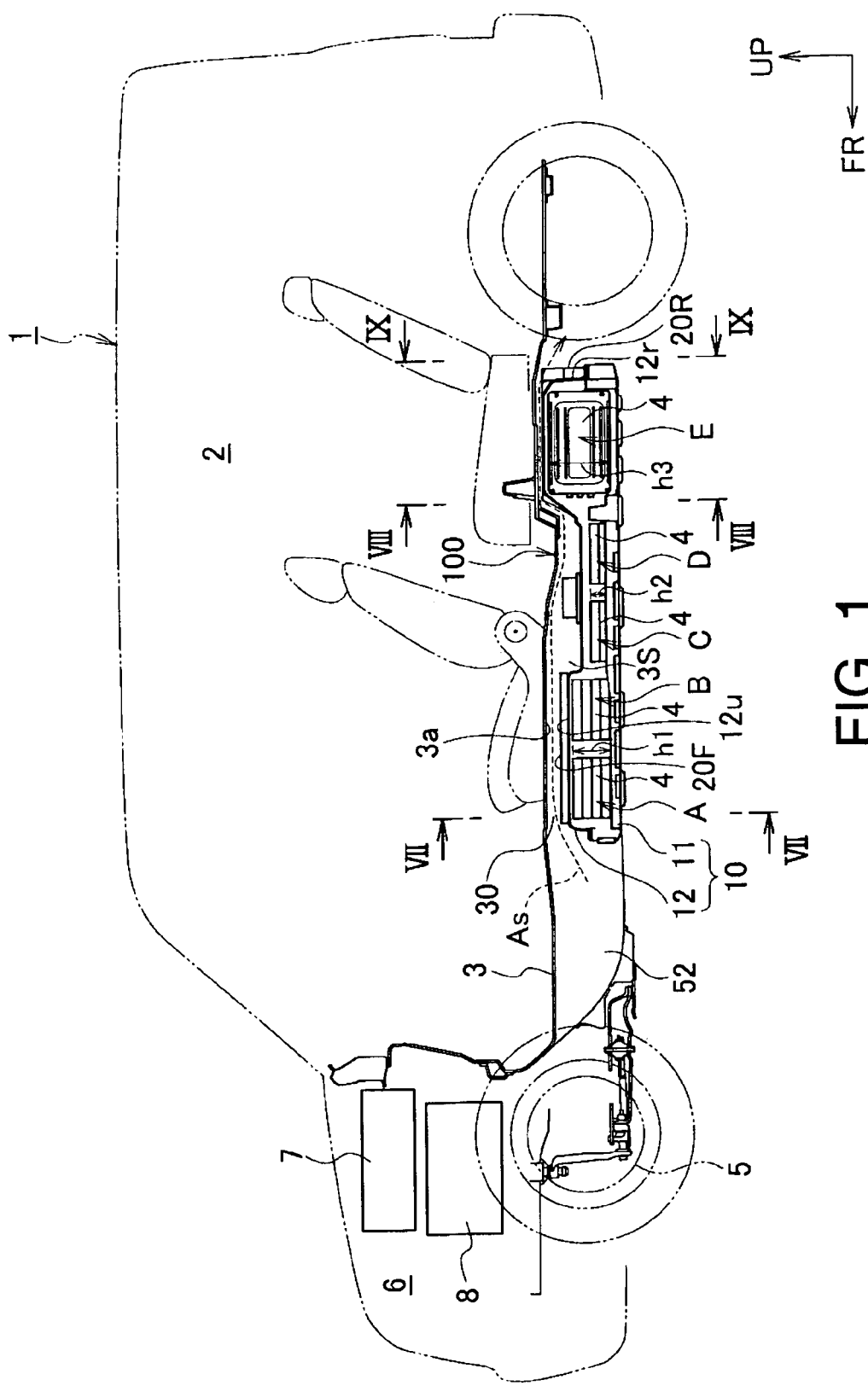
FIG. 1 is a schematic longitudinal cross sectional view of an electric vehicle equipped with a vehicle battery cooling structure according to an embodiment.

Referring initially to FIG. 1, a vehicle 1 is partially illustrated with a vehicle battery cooling structure in accordance with a first embodiment. In the figures, an arrow FR indicates a frontward direction of the vehicle, an arrow UP indicates an upward direction of the vehicle, and an arrow WD indicates a widthwise direction of the vehicle. As shown in FIG. 1, in this embodiment, the vehicle 1 includes a cabin 2 with a floor or floor panel 3 and a plurality of batteries 4 installed under the floor panel 3 of the cabin 2. The batteries 4 serve as an electrical power source that drives an electric motor 5. The electric motor 5 is operatively connected to at least one drive wheel of the vehicle 1 in a conventional manner to rotate the drive wheel of the vehicle 1. The vehicle 1 also includes a front compartment 6, a charger 7 and an inverter 8. The front compartment 6 is formed in a frontward portion of the vehicle 1 with the charger 7 and the inverter 8 disposed inside the front compartment 6. The motor 5 is also disposed inside the front compartment 6. The vehicle 1 can be configured as an electric vehicle, a hybrid vehicle or a fuel cell vehicle.

Figure 2:
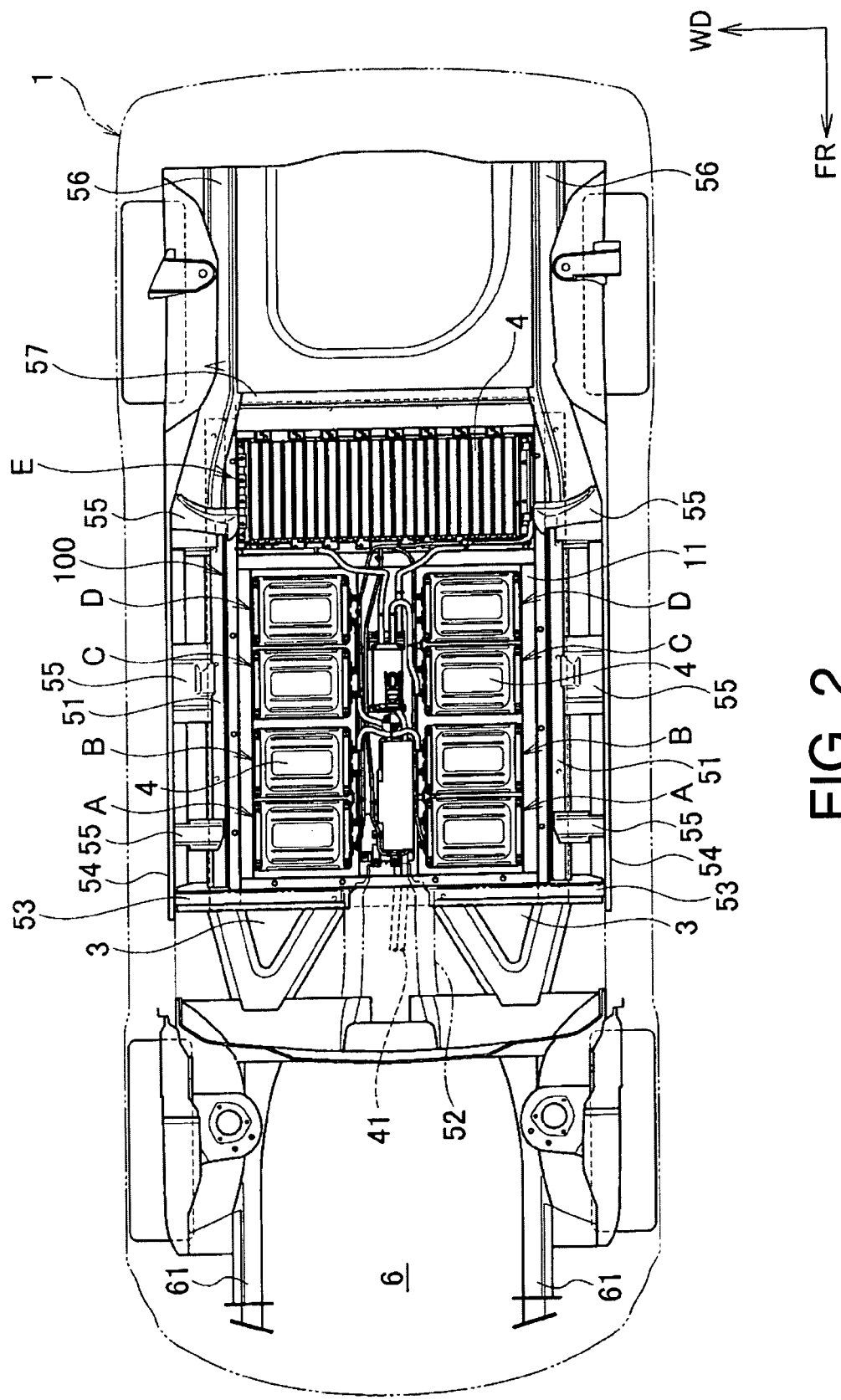
FIG. 2 is a schematic top plan view of the vehicle equipped and the vehicle battery cooling structure illustrated in FIG. 1 showing a vehicle body frame member and a battery unit.

As shown in FIG. 2, in this embodiment, the vehicle body of the vehicle 1 includes among other things, a pair of side members 51, a floor tunnel 52, a pair of cross members 53, a pair of side sills 54, a plurality of outriggers 55 and a pair of rear side members 56. The side members 51 and the cross members 53 are arranged below the cabin 2 in a longitudinally middle portion of the vehicle 1. The side members 51 are arranged on both widthwise sides of the vehicle such that they extend generally in the longitudinal direction of the vehicle 1. The cross members 53 are arranged to span in the widthwise direction of the vehicle 1 between the floor tunnel 52 and frontward end portions of the side members 51. The side sills 54 are provided in positions to the outside of the side members 51 in the widthwise direction of the vehicle 1 and arranged to extend generally in the longitudinal direction of the vehicle 1. The outriggers 55 are provided in a plurality of locations (three in this embodiment) along the longitudinal direction of the vehicle 1. Each of the outriggers 55 is arranged to span between one of the side members 51 and one of the cross members 53. The rear side members 56 are connected to rearward ends of the side members 51. The rear side members 56 extend in the longitudinal direction of the vehicle 1 on both sides of a rearward portion of the vehicle 1. A rear cross member 57 is arranged to span between the rear side members 56 in substantially the widthwise direction of the vehicle 1.

Figure 3:
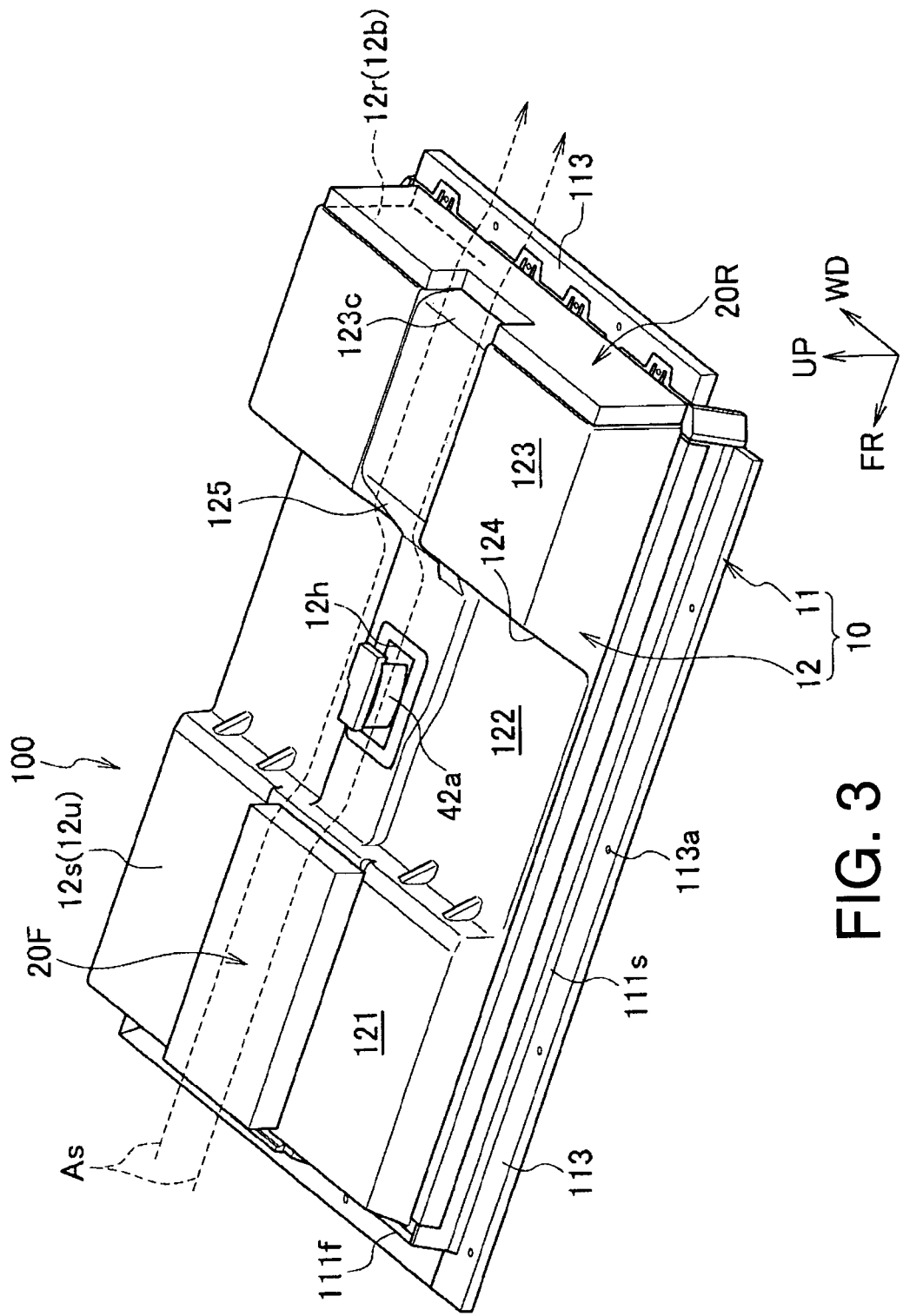
FIG. 3 is a top perspective view of the battery unit used in the vehicle battery cooling structure illustrated in FIGS. 1 and 2.

As shown in FIG. 3, the batteries 4 are stored inside a battery case 10. The batteries 4 and the battery case 10 constitute a battery unit 100. The battery unit 100 is attached to the vehicle body such as at least one of the vehicle body frame members (e.g., the side members 51, the cross member 53 and the rear cross members 57) either directly or through a bracket or mount that is arranged below the floor. In this embodiment of the vehicle 1, the battery unit 100 is detachably mounted to the vehicle body frame members under the floor 3 such that the battery unit 100 can be repeatedly detached and replaced.

As mentioned above, the motor 5, the charger 7 and the inverter 8 are arranged inside the front compartment 6. These components are housed inside the front compartment 6, and are attached either directly or through brackets to the vehicle body frame members such as a pair of front side members 61. The front side members 61 are arranged on widthwise sides of the front compartment 6. The front side members 61 extend substantially in the longitudinal direction of the vehicle 1. Preferably, the vehicle body of the vehicle 1 includes a front cross member (not shown) that spans between the front side members 61, and one or more sub members (not shown).

Figure 5:
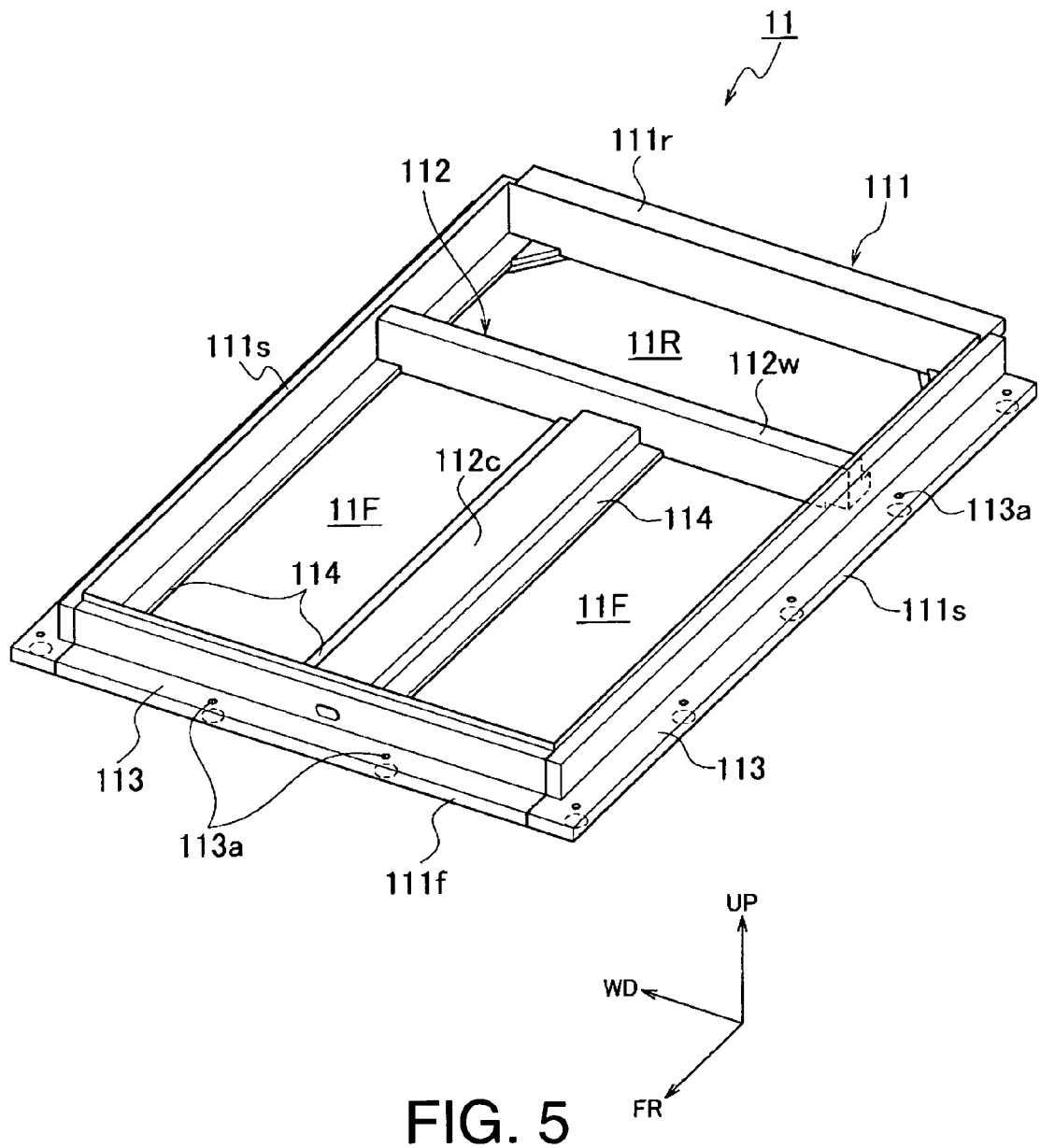
FIG. 5 is a top perspective view of the battery frame of the battery unit used in the vehicle battery cooling structure illustrated in FIGS. 1 and 2.

The battery case 10 includes a battery frame 11 (see FIG. 5) and a battery cover 12 (see FIG. 3). As seen in FIG. 5, the batteries 4 are installed in the battery frame 11. As seen in FIG. 3, the battery cover 12 covers the upper surfaces of the batteries 4 that are installed in the battery frame 11. As shown in FIG. 5, the battery frame 11 preferably includes a rectangular outer frame 111 and a T-shaped inner frame 112. The T-shaped inner frame 112 is arranged inside the outer frame 111. The outer frame 111 preferably includes a front end member 111*f*, a rear end member 111*r* and a pair of side members 111*s*. The front end member 111*f* and a rear end member 111 extend in the widthwise direction of the vehicle 1 with a prescribed spacing therebetween in the longitudinal direction of the vehicle 1. The side members 111*s* extend in the longitudinal direction of the vehicle 1 so as to join the ends of the front end member 111*f* and the rear end member 111*r*. The inner frame 112 preferably includes a transverse member 112*w* and a longitudinal member 112*c*. The transverse member 112*w* links the two opposing side members 111*s* together. The longitudinal member 112*c* links the transverse member 112*w* and the front end member 111*f* together. The transverse member 112*w* and the longitudinal member 112*c* are arranged in a T-shaped configuration.

The inner frame 112 partitions the rectangular region inside the outer frame 111 into a plurality of (three in this embodiment) rectangular regions 11F, 11F and 11R having substantially the same size. Each of the partitioned rectangular regions 11F, 11F and 11R has a rectangular shape in which the long sides are approximately twice as long as the short sides as seen from a top plan view. The partitioned rectangular regions 11F and 11F are arranged in a frontward portion of the battery frame 11 so as to be transversely adjacent to each other. The long sides of the partitioned rectangular regions 11F and 11F are oriented in the longitudinal direction of the vehicle 1. Meanwhile, the partitioned rectangular region 11R is arranged in a rearward portion of the battery frame 11. The long sides of the partitioned rectangular region 11R are oriented in the widthwise direction of the vehicle 1.

The outer frame 111 includes outer flange portions 113 and inner flange portions 114. The outer flange portions 113 are formed on an outside portion of the outer frame 111 of the battery frame 11 for attaching the battery frame 11 to the vehicle body frame member. The inner flange portions 114 are formed on inside portions of the side members 111*s* for enabling the batteries 4 to be installed on both sides of the longitudinal member 112*c*. The battery frame 11 can be attached to or detached from the vehicle body frame member from underneath a floorboard 113*a* (under the floor) by installing or removing bolts or other fasteners (not shown) installed through mounting holes 113*a* formed in the outer flange portions 113.

Figure 4:
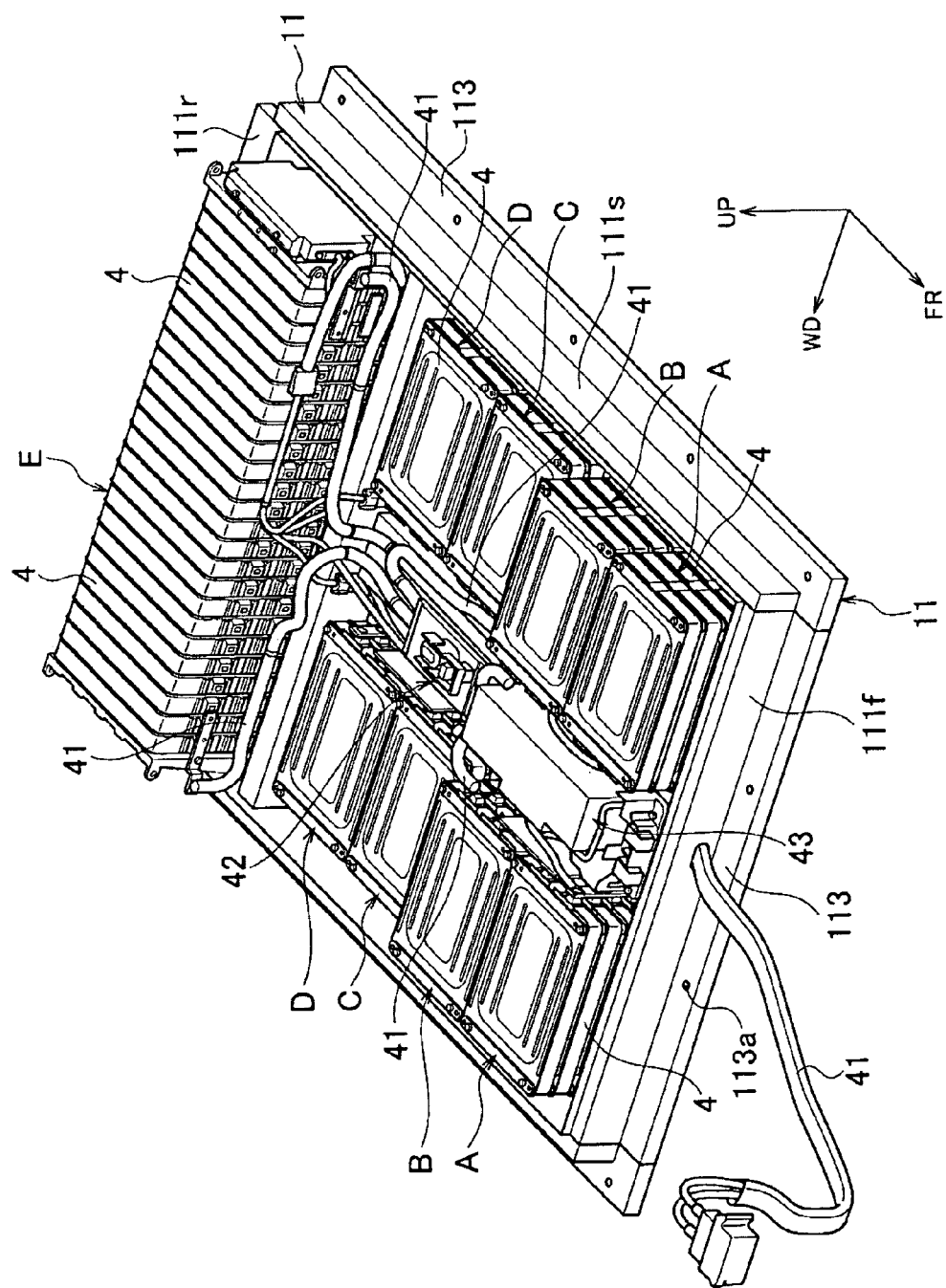
FIG. 4 is a top perspective view of the battery unit used in the vehicle battery cooling structure illustrated in FIGS. 1 and 2 with the cover removed.

As shown in FIG. 4, the batteries 4 are individual flat, rectangular block-shaped entities. The batteries 4 are stacked on the battery frame 11 in a plurality of battery groups A to E. Some of the batteries 4 are arranged stacked vertically in each of the left and right partitioned rectangular regions 11F and 11F of a frontward portion of the battery frame 11. Also some of the batteries 4 are arranged stacked in a widthwise direction in the partitioned rectangular region 11R of a rearward portion of the battery frame 11. As shown in FIG. 1, the vertically stacked batteries 4 arranged in each of the frontward partitioned rectangular regions 11F and 11F are divided into four battery groups A, B, C and D arranged adjacently in the longitudinal direction of the vehicle 1. Among these, each of the frontward battery groups A and B includes a stack of four of the batteries 4. Also, each of the rearward battery groups C and D includes a stack of two of the batteries 4. Thus, a stack height difference exists between the frontward battery groups A and B and the rearward battery groups C and D. Also, between the left and right partitioned rectangular regions 11F and 11F, each pair of corresponding battery groups A, B, C and D have the same number of stacked batteries 4 such that the left and right battery groups are symmetrical to one another. Meanwhile, a single battery group E stacked in the widthwise direction of the vehicle 1 is installed in the rearward partitioned rectangular region 11R of the battery frame 11. The frontward battery groups A and B have a height h1. The rearward battery groups C and D have a height h2. The single battery group E has a height h3. Thus, in this embodiment, the heights h1, h2 and h3 have the dimensional relationship of h3>h1>h2.

The battery cover 12 covers all of the battery groups A to E, as shown in FIGS. 1 and 3. The battery cover 12 is detachably attached to the battery frame 11. A top plate 12*u* of the battery cover 12 is configured to generally follow the contour of the top surfaces of the battery groups A to E. The plate 12*u* of the battery cover 12 is also configured to be in close proximity to the same top surfaces. More specifically, the top plate 12*u* of the battery cover 12 includes a first cover portion 121, a second cover portion 122 and a third cover portion 123. The first cover portion 121 covers the first battery groups A and B. The second cover portion 122 covers the second battery groups C and D. The third cover portion 123 covers the third battery group E. The first to third cover portions 121, 122 and 123 have a step-like form. Each of the first to third cover portions 121, 122 and 123 has a height corresponding to the heights h1 to h3 of the battery groups A to E, respectively. In this embodiment, since the heights h1 to h3 have the dimensional relationship of h2<h1<h3. The height h2 of the second cover portion 122 is the lowest. The height h3 of the third cover portion 123 is the highest. The height h1 of the first cover portion 121 is in between the heights h2 and h3 of the second and third cover portions 122 and 123.

As shown in FIG. 4, in this battery unit 100, such components as a harness 41, a switch box 42 and a junction box 43 are arranged on the longitudinal member 112c between the left and right partitioned rectangular regions 11F and 11F. The harness 41 is disposed between the batteries 4. Various electrical components (i.e., the motor 5, the charger 7, the inverter 8, etc.) are arranged in the front compartment 6, and are electrical connected to the harness 41. As shown in FIG. 3, an opening 12h is formed in the second cover portion 122 of the battery cover 12 in a position corresponding to the switch box 42. An operating part 42a of the switch box 42 is arranged to protrude upward through the opening 12h such that it can be operated from an open-and-closable window (not shown) provided in the floor panel 3.

It is preferable to cool the battery unit 110 as needed because the batteries 4 emit heat during use. In this embodiment, a bottom portion of the battery unit 100 is exposed toward the road surface and thus can be cooled by air flow as the vehicle moves. In this embodiment, as shown in FIG. 1, an air flow passage 30 is formed between a bottom surface 3a of the floor panel 3 (i.e., the upper surface of a recessed portion 3S formed in the floor panel 3 for housing the battery unit 100) and an upper surface 12s of the battery unit 100 to enable a stream of air As (see FIGS. 1 and 3) produced by motion of the vehicle 1 to pass from front to rear. Thus, an upper portion of the battery unit 100 is air-cool.

In this embodiment, a front water or cooling jacket 20F is used to further cool the upper portion of the battery unit 100, and a rear water or cooling jacket 20R is used to cool a rear portion of the battery unit 100. The front cooling jacket 20F is mounted on the upper surface 12s of the battery unit 100. Thus, the front cooling jacket 20F enables the upper portion of the battery unit 100 to be cooled effectively even when it is difficult to obtain a cooling effect with air flow. A coolant flowing inside the front cooling jacket 20F serves to cool the upper portion (i.e., the top plate 12u serving as an upper wall) of the battery unit 100. The front cooling jacket 20F constitutes a liquid cooling unit. As shown in FIG. 1, the front cooling jacket 20F is arranged facing the air flow passage 30. In this embodiment, as shown in FIG. 3, the front cooling jacket 20F is arranged on a widthwise-middle portion of the first cover portion 121, which corresponds to a frontward portion of the battery cover 12.

Figure 6:
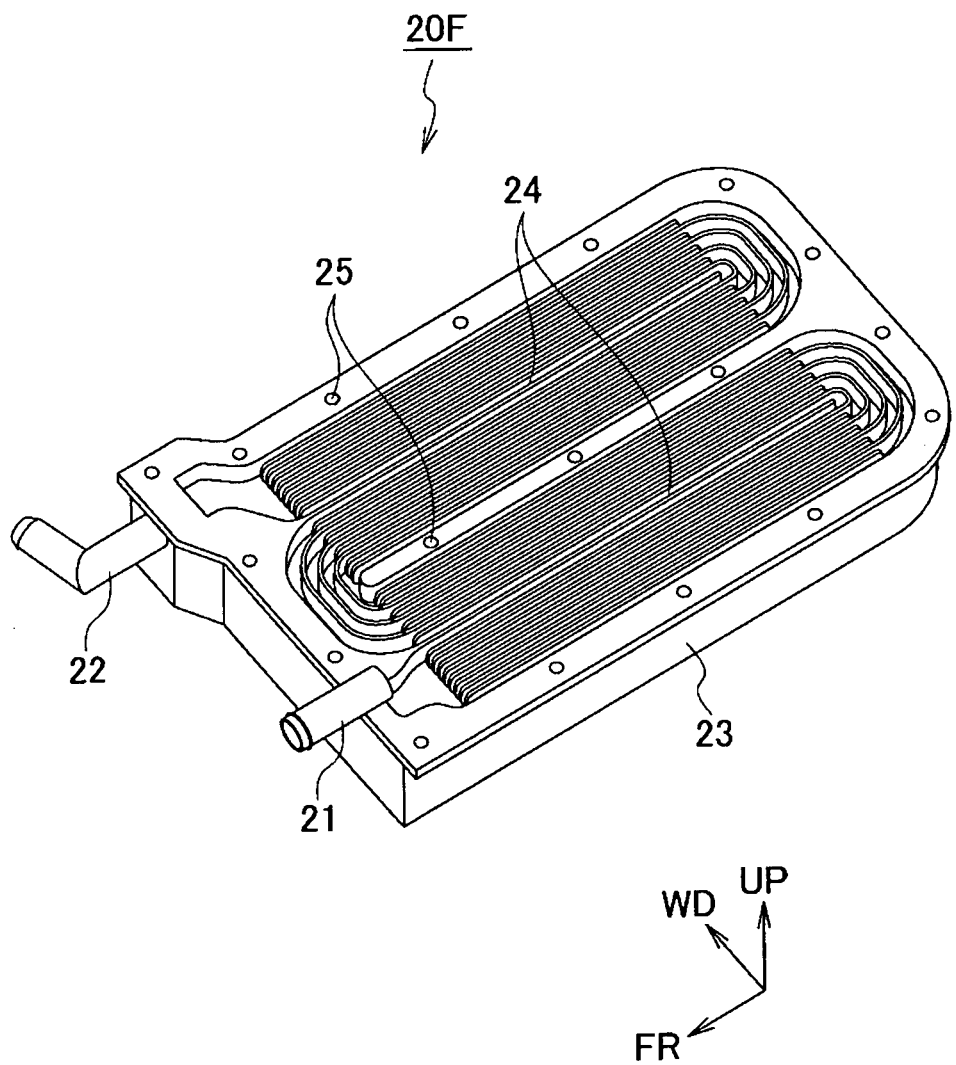
FIG. 6 is a top perspective view of the cooling jacket used in the vehicle battery cooling structure FIGS. 1 and 2.

As shown in FIG. 6, the front cooling jacket 20F is generally shaped like a flat, rectangular box. The front cooling jacket 20F includes an inlet 21, an outlet 22, a main block 23 and a plurality of coolant passages 24. The main block 23 encloses the coolant passages 24. The coolant passages 24 are arranged parallel to one another and configured to double (bend) back and forth in a zigzagged pattern between the inlet 21 and the outlet 22. FIG. 6 shows the inside of the front cooling jacket 20F with a cover plate (not shown) removed. The cover plate is attached in a watertight fashion with bolts installed in a plurality of threaded holes 25 formed in a rim portion surrounding the coolant passages 24 of the main block 23. Packing is arranged between the cover plate and the main block 23 when the cover plate is installed.

As the coolant flows through the zigzagged coolant passage 24 of the front cooling jacket 20F on its way from the inlet 21 to the outlet 22, it exchanges heat with the main block 23. Then the main block 23 exchanges heat with the top plate 12u of the battery cover 12, on which the main block 23 is mounted. As a result, the coolant enables the upper portion of the battery unit 100 to be cooled effectively. The front cooling jacket 20F and the rear cooling jacket 20R (explained later) are connected to a radiator (not shown) provided in a frontward portion of the front compartment 6 by a pair of coolant pipes 26 (see FIGS. 7 and 8) such that the coolant is cooled by the radiator.

Figure 7:
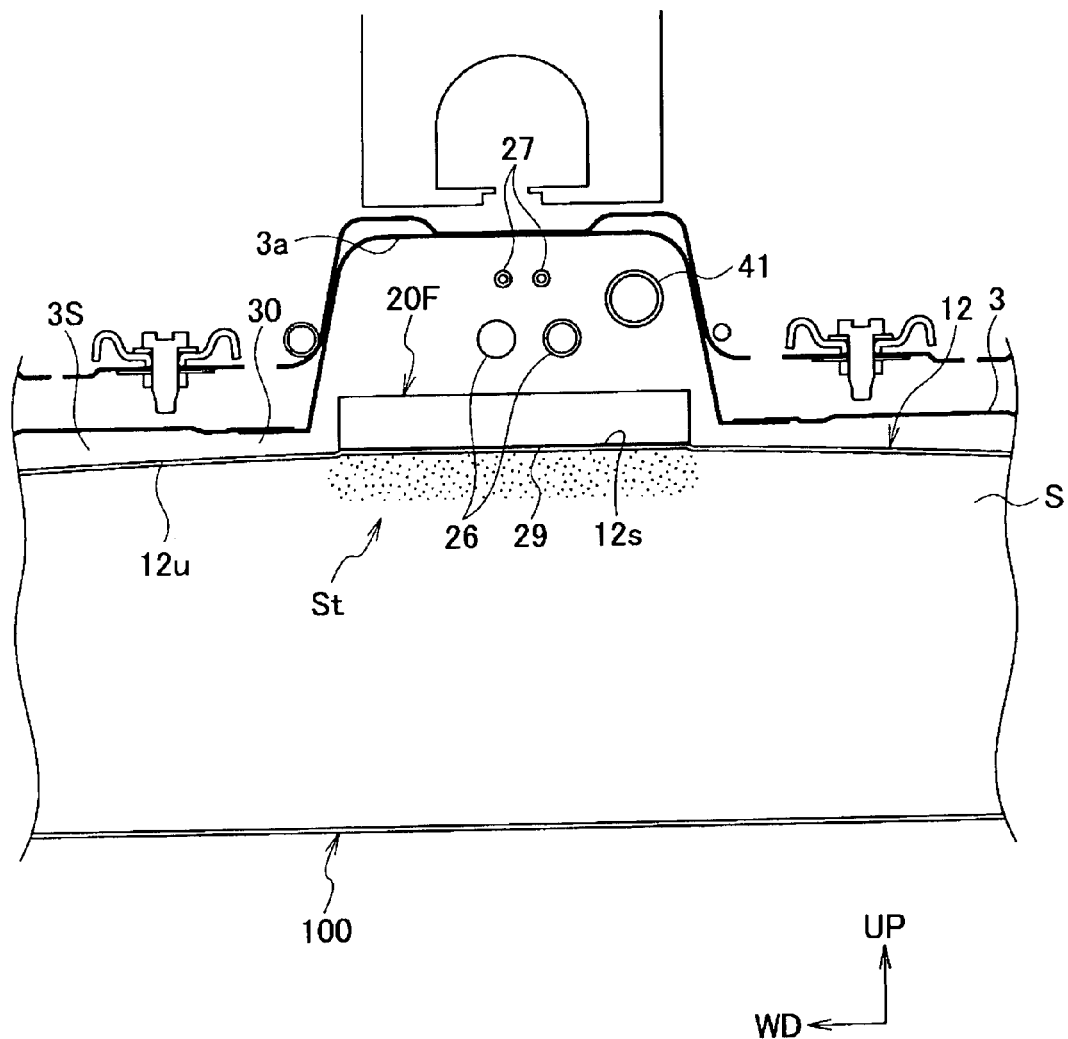
FIG. 7 is a schematic cross sectional view of the vehicle battery cooling structure illustrated in FIGS. 1 and 2 as seen along section line VII-VII of FIG. 1.

As shown in FIG. 7, the floor tunnel 52 is formed in a widthwise-middle portion of the floor panel 3, and extends substantially in the longitudinal direction of the vehicle 1. The floor tunnel 52 protrudes in an upward direction of the vehicle body of the vehicle 1. In this embodiment, at least an upper portion of the air flow passage 30 is formed by the floor tunnel 52. In this embodiment, the floor tunnel 52 tapers slightly in an upward direction. In other words, an upper portion of the floor tunnel 52 is narrower than a lower portion of the floor tunnel 52 such that the floor tunnel 52 has trapezoidal cross sectional shape. The harness 41, the coolant pipes 26, a pair of brake pipes 27 and other components are routed through the inside of the floor tunnel 52. In this embodiment, the front cooling jacket 20F is arranged inside the floor tunnel 52 at the lower portion of the floor tunnel 52.

Figure 8:
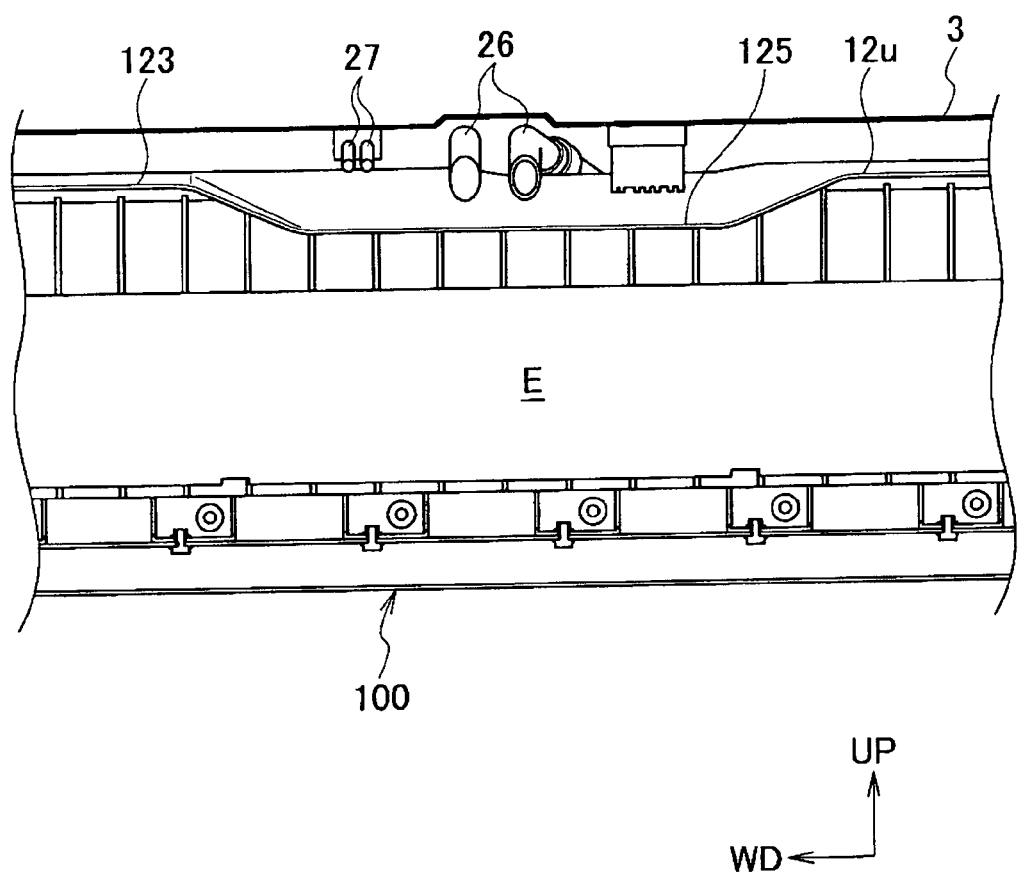
FIG. 8 is a schematic cross sectional view of the vehicle battery cooling structure illustrated in FIGS. 1 and 2 as seen along section line VIII-VIII of FIG. 1.
Figure 9:
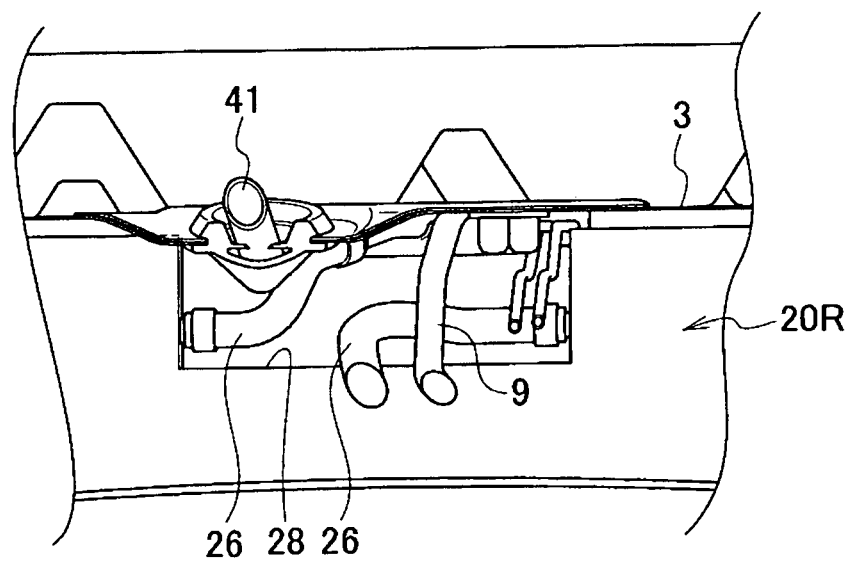
FIG. 9 is a schematic cross sectional view of the vehicle battery cooling structure illustrated in FIGS. 1 and 2 as seen along section line IX-IX of FIG. 1.

As shown in FIGS. 3 and 8, a trough shaped section 125 is provided in a slanted portion 124 between the second cover portion 122 and the third cover portion 123 of the battery cover 12. In this embodiment, the trough shaped section 125 is formed in the top plate 12u in position corresponding to a widthwise middle portion of the slanted portion 124. The trough shaped section 125 is downwardly recessed to have a prescribed width and a comparatively shallow depth. The trough shaped section 125 extends in a substantially longitudinal direction of the vehicle 1. The trough shaped section 125 forms at least a portion of a lower portion of the air flow passage 30. In this embodiment, the trough shaped section 125 is used as a guide for the coolant pipe 26, the brake pipes 27 and other components routed through the floor tunnel 52.

As described above, in this embodiment, both the floor tunnel 52 and the trough shaped section 125 are arranged in a middle position with respect to the widthwise direction of the vehicle 1. The floor tunnel 52 and the trough shaped section 125 are also both oriented to extend in the longitudinal direction of the vehicle 1. As a result, air passing through the floor tunnel 52 flows rearward with respect to the longitudinal direction of the vehicle 1 and passes more smoothly through the trough shaped section 125. In other words, the air stream As is guided by the floor tunnel 52 and the trough shaped section 125 so as to flow in a longitudinally rearward direction in a widthwise-middle portion of the vehicle 1. The air stream As is further guided by the floor tunnel 52 and the trough shaped section 125 so as to become a main air stream in the air flow passage 30 formed between the floor panel 3 and the battery unit 100.

In this embodiment, the battery cover 12 is made of a heat conductive material (e.g., a metal such as a iron-based material or an aluminum alloy). As a result, the cooling effect of the front cooling jacket 20F can be achieved over a wider region and variation (unevenness) of the cooling effect on the left and right sides of the front cooling jacket 20F resulting from the front cooling jacket 20F being arranged in a widthwise middle portion can be suppressed. The top plate 12u serves as an upper wall of the battery cover 12. The top plate 12u bulges or protrudes upward such that a widthwise middle portion is in a highest position that also corresponds to where the front cooling jacket 20F is arranged. With such a bulged or protruding shape, the heat from the batteries 4 causes the temperature of the air inside a space S of the battery case 10 to be highest at a highest position inside the space S, i.e., in an upper portion St of a widthwise-middle portion of the space S. Thus, by cooling the top plate 12u, which is closely adjacent to the upper portion St of the space S, the front cooling jacket 20F cools the space S, and thereby, cools the batteries 4 in an effective manner.

In this embodiment, a pliable heat-conductive sheet member 29 (e.g., a sheet-like member that contains an acrylic or other synthetic resin material that is flexible and thermally conductive) is arranged between the front cooling jacket 20F and the top plate 12u. The thermally conductive sheet member 29 is arranged to adhere closely to both a bottom surface of the front cooling jacket 20F and an upper surface 12s of the top plate 12u. As a result, the efficiency with which heat is conducted between the front cooling jacket 20F and the top plate 12u can be increased. Also the cooling effect of the front cooling jacket 20F can be improved because the gap between the cooling jacket 20F and the top plate 12u is reduced and a closer contact is achieved.

A rear surface of the battery unit 100 has little contact with air flow resulting from movement of the vehicle 1 and is not readily air-cooled by air flow. Therefore, in this embodiment, the rear cooling jacket 20R is attached to a laterally extending rearward surface 12r of the battery cover 12, which corresponds to a rear surface of the battery unit 100, as shown in FIGS. 1 and 3. A coolant flowing inside the cooling jacket 20R serves to cool a rearward portion of the battery unit 100 (i.e., a rearward side plate 12b). The rear cooling jacket 20R constitutes a liquid cooling unit. Similarly to the front cooling jacket 20F shown in FIG. 6, the rear cooling jacket 20R has a main block enclosing a plurality of coolant passages that are arranged parallel to one another and routed in a zigzagged form between an inlet and an outlet. As the coolant flows through the zigzagged coolant passage on its way from the inlet to the outlet, it exchanges heat with the main block. The main block then exchanges heat with the side plate 12b of the battery cover 12, on which the main block is mounted. As a result, the coolant can cool a rearward portion of the battery unit 100.

In this embodiment, as explained previously, the floor tunnel 52 and the trough shaped section 125 are arranged in the widthwise-middle portion of the vehicle 1 such that a stream of air As flowing from front to rear through the widthwise-middle portion of the vehicle 1 becomes a main stream of air within the air flow passage 30. As a result, the air stream As is guided toward a widthwise-middle portion of the rear cooling jacket 20R.

In this embodiment, a notch 28 is formed in an upper edge portion of the rear jacket 20R in the widthwise-middle position such that the air stream As passing through the air flow passage 30 is discharged rearwardly through the notch 28. As shown in FIG. 3, the notch 28 forms at least a portion of a bottom rearward end portion of the air flow passage 30. Since the rear cooling jacket 20R is cooled by the air stream As flowing through the notch 28, the temperature of the rear cooling jacket 20R can be lowered more easily than with a configuration in which a notch 28 is not provided.

In this embodiment, as shown in FIG. 3, a chamfered portion 123c is formed in an upper edge of a rearward end of the battery cover 12 in a position corresponding to the notch 28. The chamfered portion 123c enables the air stream As flowing over the upper surface 12s of the third cover portion 123 in the longitudinal direction of the vehicle 1 to flow more smoothly to the notch 28, thereby improving a rearward discharge characteristic of the air stream As.

As explained previously, in this embodiment, the front cooling jacket 20F is attached to the upper surface 12s of the battery cover 12 constituting the battery case 10 of the battery unit 100. The effectiveness of air cooling is diminished when a height position of the floor panel 3 is low and a gap between the floor panel 3 and the battery unit 100 cannot be widened. With this embodiment, even if the height position of the floor panel 3 cannot be easily raised and a gap between the floor panel 3 and the battery unit 100 cannot be easily widened, the upper portion of the battery unit 100 can be cooled more effectively because of the front cooling jacket 20F arranged in the gap.

As explained previously, in this embodiment, the front cooling jacket 20F is attached to the upper surface 12s of the battery cover 12 in a position located on the first cover portion 121, which is a frontward portion of the battery cover 12. As explained previously, the second battery groups C and D are arranged in a longitudinally middle portion of the battery unit 100 and have a smaller number of stacked batteries 4 than any of the other battery groups. Meanwhile, the first battery groups A and B arranged in a more frontward position have a larger number of stacked batteries 4 than the second battery groups C and D and, thus, have a larger need for cooling. Therefore, the front cooling jacket 20F is attached to the first cover portion 121 of the battery cover 12, which corresponds to the first battery groups A and B.

In this embodiment, the air flow passage 30 is configured to allow a stream of air to flow from a frontward portion of the vehicle to a rearward portion of the vehicle when the vehicle moves, and the front cooling jacket 20F and the rear cooling jacket 20R are arranged exposed to the air flow passage 30. Thus, the air stream As flowing through the air flow passage 30 serves to cool the front cooling jacket 20F and the rear cooling jacket 20R and enables the battery unit 100 to be cooled more effectively. Also, by obtaining an effect of cooling the battery unit 100 with the air stream As, the total cooling of the battery unit 100 is increased because it is both water cooled and air cooled.

In this embodiment, the upwardly protruding floor tunnel 52 is formed in the floor panel 3, and extends substantially in the longitudinal direction of the vehicle 1. At least a portion of the air flow passage 30 is formed by the floor tunnel 52. Thus, a cross sectional area of the air flow passage 30 is larger at the portion formed by the floor tunnel 52 and the flow rate of the air stream As can be increased more easily in the same section, thereby enabling an upper portion of the battery unit 100 to be cooled more effectively. The air stream As can also be guided by the floor tunnel 52 such that the air stream As flows more smoothly and adheres more closely to a desired flow path. Also, although the floor tunnel 52 is provided for routing pipes and wiring, it can be used effectively to enlarge the air flow passage 30 in a more efficient manner.

In this embodiment, the downwardly recessed trough shaped section 125 is formed in an upper surface of the battery unit 100, and extends substantially in the longitudinal direction of the vehicle 1. At least a portion of the air flow passage 30 is formed by the trough shaped section 125. Thus, a cross sectional area of the air flow passage 30 is larger at the portion formed by the trough shaped section 125 and the flow rate of the air stream As can be increased more easily in the same section, thereby enabling the battery unit 100 to be cooled more effectively. Also, the air stream As is guided by the trough shaped section 125 such that it flows more smoothly and adheres more closely to a desired flow path.

In this embodiment, at least a portion of the top plate 12*u* serving as the upper wall of the battery cover 12 is made of a thermally conductive material and the front cooling jacket 20F is arranged on a widthwise-middle portion of the upper surface 12*s* of the top plate 12*u*. As a result, the cooling effect of the front cooling jacket 20F can be spread over a wider region by utilizing the top plate 12*u* made of a thermally conductive material, and variation (unevenness) of the cooling effect on the left and right sides of the front cooling jacket 20F resulting from the front cooling jacket 20F being arranged in a widthwise-middle portion can be suppressed.

In this embodiment, the top plate 12*u* (which serves as an upper wall of the battery cover 12) is bulged upward such that the widthwise middle portion where the front cooling jacket 20F is arranged is in a highest position. With such a bulged shape, the temperature of the air inside the space S of the battery case 10 is highest at a highest position inside the space S, i.e., in an upper portion St of a widthwise-middle portion of the space S. Thus, by cooling the top plate 12*u*, which is closely adjacent to the upper portion St of the space S, the front cooling jacket 20F cools the space S, and thereby, cools the batteries 4 in a more effective manner.

In this embodiment, the battery unit 100 is equipped with the front cooling jacket 20F and the rear cooling jacket 20R, which are attached to the battery cover 12 in an integral fashion. In this way, the front cooling jacket 20F and the rear cooling jacket 20R can be arranged in a prescribed position more easily than if they were not provided in an integral fashion. Another advantage is that when the battery unit 100 is removed from the vehicle 1, maintenance can be performed on the front cooling jacket 20F and the rear cooling jacket 20R comparatively easily.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "frontward", "rearward", "above", "downward", "vertical", "horizontal", "below" and "transverse" as well as any other similar directional terms refer to those directions of a vehicle having the vehicle battery cooling structure. Accordingly, these terms, as utilized to describe the electric vehicle structure should be interpreted relative to a vehicle having the vehicle battery cooling structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the specifications of the battery unit and the cooling jacket (position, number, shape, side, configuration, etc.) are not limited to those presented in the embodiment and can be changed. Similarly, the specifications (size, number, shape, size, etc.) of the air flow passage can be changed as appropriate. The functions of one element can be performed by two, and vice versa. Thus, the foregoing descriptions of the embodiments according to the present invention are provided for illustration only, and not for the purpose of limiting the invention as defined by the appended claims and their equivalents.

What is claimed is:

1. A vehicle battery cooling structure comprising:
a vehicle body including a floor panel and a vehicle body frame member;
a battery unit attached to the vehicle body frame member and arranged below the floor panel, the battery unit including a battery and a battery case that houses the battery, the battery case including a most forward end having a laterally extending forward surface that faces toward a front of the vehicle and a most rearward end having a laterally extending rearward surface that faces toward a rear of the vehicle, and the battery case being configured such that an air stream produced by forward motion of the vehicle strikes the most forward end of the battery case; and
a cooling jacket attached to an upper outer surface on an outside of the battery case that houses the battery, the cooling jacket being configured to form a liquid circuit that directs cooling liquid proximate to the upper outer surface of the battery case without exposing an interior of the battery case to the cooling liquid;
the floor panel and the upper outer surface of the battery case being vertically spaced apart, and the floor panel and an upper surface of the cooling jacket being spaced apart, to define an air flow passage between the floor panel and the upper outer surface of the battery case and between the floor panel and the upper surface of the cooling jacket, the air flow passage being configured to direct at least a portion of the air stream produced by the forward motion of the vehicle to pass therethrough and over the upper surface of the cooling jacket and the upper outer surface of the battery case in a direction from the most forward end of the battery case toward the most rearward end of the battery case.

2. The vehicle battery cooling structure as recited in claim 1, wherein
the battery case includes a rearward portion, a frontward portion and a middle portion, the rearward, frontward and middle portions having different heights, with the height of the rearward portion being highest, the height of the frontward portion being next highest and the height of the middle portion being lowest; and
the cooling jacket is disposed on the frontward portion of the battery case.

3. The vehicle battery cooling structure as recited in claim 1, wherein
the battery includes first, second and third battery groups, with the first battery group being arranged in a frontward position that is closer to the most forward end of the battery case relative to the second and third battery groups, the second battery group being arranged between the first and third battery groups, and the third battery group being arranged in a rearward position that is closer to the most rearward end of the battery case relative to the first and second battery groups, and
the battery case includes a first cover portion covering the first battery group with the cooling jacket disposed thereon, a second cover portion covering the second battery group and a third cover portion covering the third battery group, the upper outer surface of the battery case being in close proximity to upper ends of the first, second and third battery groups and with the first, second and third cover portions having different heights such that the third cover portion is higher than the first cover portion, which is higher than second cover portion.

4. The vehicle battery cooling structure as recited in claim 1, wherein
the upper outer surface of the battery case includes a downwardly recessed trough shaped section that extends longitudinally with respect to the vehicle body such that at least a portion of the air flow passage is formed by the trough shaped section.

5. The vehicle battery cooling structure as recited in claim 1, wherein
the upper outer surface of the battery case at least partially includes a thermally conductive material, with the cooling jacket being arranged on a widthwise-middle portion of the upper outer surface of the battery case.

6. The vehicle battery cooling structure as recited in claim 5, wherein
the upper outer surface of the battery case protrudes upward at the widthwise middle portion to correspond to a highest position of the upper outer surface of the battery case.

7. The vehicle battery cooling structure as recited in claim 1, wherein
the battery unit and the cooling jacket are provided as a single integrated unit that is detachably and reinstallably attached to vehicle body frame member.

8. The vehicle battery cooling structure as recited in claim 2, wherein
the battery includes first, second and third battery groups, with the first battery group being arranged in a frontward position that is closer to the most forward end of the battery case relative to the second and third battery groups, the second battery group being arranged between the first and third battery groups, and the third battery group being arranged in a rearward position that is closer to the most rearward end of the battery case relative to the first and second battery groups, and
the battery case includes a first cover portion covering the first battery group with the cooling jacket disposed thereon, a second cover portion covering the second battery group and a third cover portion covering the third battery group, the upper outer surface of the battery case being in close proximity to upper ends of the first, second and third battery groups and with the first, second and third cover portions having different heights such that the third cover portion is higher than the first cover portion, which is higher than second cover portion.

9. The vehicle battery cooling structure as recited in claim 2, wherein
the floor panel and the upper outer surface of the battery case are vertical spaced apart to define an air flow passage therebetween that allows an air stream produced by motion of the vehicle to pass therethrough, with the cooling jacket being exposed to the air flow passage.

10. The vehicle battery cooling structure as recited in claim 2, wherein
the upper outer surface of the battery case at least partially includes a thermally conductive material, with the cooling jacket being arranged on a widthwise-middle portion of the upper outer surface of the battery case.

11. The vehicle battery cooling structure as recited in claim 3, wherein
the upper outer surface of the battery case at least partially includes a thermally conductive material, with the cooling jacket being arranged on a widthwise-middle portion of the upper outer surface of the battery case.

12. The vehicle battery cooling structure as recited in claim 4, wherein
the upper outer surface of the battery case at least partially includes a thermally conductive material, with the cooling jacket being arranged on a widthwise-middle portion of the upper outer surface of the battery case.

13. The vehicle battery cooling structure as recited in claim 2, wherein
the battery unit and the cooling jacket are provided as a single integrated unit that is detachably and reinstallably attached to vehicle body frame member.

14. The vehicle battery cooling structure as recited in claim 3, wherein
the battery unit and the cooling jacket are provided as a single integrated unit that is detachably and reinstallably attached to vehicle body frame member.

15. A vehicle battery cooling structure comprising:
a vehicle body including a floor panel and a vehicle body frame member;
a battery unit attached to the vehicle body frame member and arranged below the floor panel, the battery unit including a battery and a battery case that houses the battery, the battery case including a most forward facing end having a laterally extending forward surface that faces toward a front of the vehicle and a most rearward facing end having a laterally extending rearward surface that faces toward a rear of the vehicle, and the battery case being configured such that an air stream produced by forward motion of the vehicle strikes the most forward facing end of the battery case; and
a cooling jacket attached to an upper surface of the battery case that houses the battery, the cooling jacket being configured to form a liquid path that directs cooling liquid proximate to the upper surface of the battery case without exposing an interior of the battery case to the cooling liquid;
the floor panel and the upper surface of the battery case being vertically spaced apart, and the floor panel and an upper surface of the cooling jacket being spaced apart, to define an air flow passage between the floor panel and the upper surface of the battery case and between the floor panel and the upper surface of the cooling jacket, the air flow passage being configured to direct at least a portion of the air stream produced by the forward motion of the vehicle to pass therethrough and over the upper surface of the cooling jacket and the upper surface of the battery case in a direction from the most forward facing end of the battery case toward the most rearward facing end of the battery case, and the floor panel including an upwardly protruding tunnel section that extends longitudinally with respect to the vehicle body such that at least a portion of the air flow passage is formed by the tunnel section.

16. The vehicle battery cooling structure as recited in claim 15, wherein
the upper outer surface of the battery case at least partially includes a thermally conductive material, with the cooling jacket being arranged on a widthwise-middle portion of the upper outer surface of the battery case.

17. The vehicle battery cooling structure as recited in claim 15, wherein
the battery unit and the cooling jacket are provided as a single integrated unit that is detachably and reinstallably attached to vehicle body frame member.

\* \* \* \* \*